United States Patent
Bohland et al.

(10) Patent No.: US 6,391,165 B1
(45) Date of Patent: May 21, 2002

(54) RECLAIMING METALLIC MATERIAL FROM AN ARTICLE COMPRISING A NON-METALLIC FRIABLE SUBSTRATE

(75) Inventors: John Raphael Bohland, Oregon; Igor Ivanovich Anisimov, Whitehouse; Todd James Dapkus, Toledo; Richard Anthony Sasala, Toledo; Ken Alan Smigielski, Toledo; Kristin Danielle Kamm, Swanton, all of OH (US)

(73) Assignee: First Solar, LLC, Perrysburg, OH (US)

( * ) Notice: Subject to any disclaimer, the term of this patent is extended or adjusted under 35 U.S.C. 154(b) by 0 days.

(21) Appl. No.: 09/573,100

(22) Filed: May 17, 2000

Related U.S. Application Data (62) Division of application No. 09/076,191, filed on May 12, 1998, now Pat. No. 6,129,779.
(60) Provisional application No. 60/046,290, filed on May 13, 1997.

(51) Int. Cl.[7] .......................... C25D 17/00; B02C 13/00; C22B 3/00; C22B 1/00; B01D 24/00
(52) U.S. Cl. ...................... 204/198; 204/227; 204/240; 209/12.1; 241/79; 241/DIG. 38; 266/101; 266/137; 266/170; 210/295
(58) Field of Search ............................... 266/101, 137, 266/168, 170; 209/12.1; 204/242, 198, 227, 240; 210/295; 241/DIG. 38, 79

(56) References Cited

U.S. PATENT DOCUMENTS

| 4,171,250 A | * | 10/1979 | Eddleman ................... 204/119 |
| 5,405,588 A | | 4/1995 | Kronberg |
| 5,413,226 A | * | 5/1995 | Matthews et al. .......... 209/668 |
| 5,660,335 A | * | 8/1997 | Köppl et al. .................... 241/1 |
| 5,779,877 A | | 7/1998 | Drinkard, Jr. et al. |
| 5,897,685 A | | 4/1999 | Goozner et al. |

OTHER PUBLICATIONS

Sasala et al., "Physical and Chemical Pathways for Economic Recycling of Cadmium Telluride Thin–Film Photovoltaic Modules." 25th PVSC, IEEE pp. 865–868 (No Date).

Robert E. Goozner, William F. Drinkard, Mark O. Long and Christi M. Byrd; A Process To Recycle Thin Film PV Materials; Sep. 30–Oct. 3, 1997; pp. 1161–1163; 1997 IEEE; 26th PVSC; Anaheim, CA.

John Bohland, Igor Anisimov and Todd Dapkus, Economic Recycling of CDTE Photovoltaic Modules, Sep. 30–Oct. 3, 1997; pp. 355–358; IEEE 26th PVSC; Anaheim, CA.

* cited by examiner

Primary Examiner—Donald R. Valentine
(74) Attorney, Agent, or Firm—Brooks & Kushman P.C.

(57) ABSTRACT

A system for reclaiming cadmium and tellurium from cadmium telluride solar cell. The system comprises a crushing apparatus for crushing cells into pieces, a first conveyor for transporting solar cells to the crushing apparatus, a barrel for receiving etchant for etching the crushed cell pieces, a second conveyor for transporting crusehed pieces of cells from the crushing apparatus to the barrel, and a screen separator for separating the crushed cell pieces into at least three components.

18 Claims, 6 Drawing Sheets

RECLAIMING METALLIC MATERIAL FROM AN ARTICLE COMPRISING A NON-METALLIC FRIABLE SUBSTRATE

CROSS-REFERENCE TO RELATED APPLICATION

This is a divisional of application Ser. No. 09/076,191, filed on May 12, 1998, now U.S. Pat. No. 6,129,779.

This application claims the benefit of U.S. Provisional Application No. 60/046,290, filed May 13, 1997.

TECHNICAL FIELD

This invention relates to a method and system for reclaiming metallic material from an article comprising a non-metallic friable substrate.

BACKGROUND

There are numerous articles which contain a hazardous metallic material and a non-metallic friable substrate which, while providing better performance and lower costs over articles which currently have greater market acceptance, have not realized their full market potential because of end-of-life hazardous disposal considerations stemming from the hazardous metallic material contained within the article. For example, while cadmium telluride photovoltaic (CdTe PV) solar cells offer the promise of renewable, non-polluting, and low cost electricity generation, it is believed that since cadmium and cadmium compounds have well known toxicological properties that require consideration of non-dispersive end-of-life module and manufacturing scrap disposal, a reclamation method will hasten market acceptance of CdTe PV solar cells.

Moreover, there are many other articles which have a relatively expensive metallic material and a non-metallic friable substrate which could be made more cost effective, and thus gain greater market acceptance, if the relatively expensive material could be reclaimed from the article in a relatively simple and cost effective manner. For example, if the gold in plasma flat panel displays could be easily and inexpensively recovered, the cost of using plasma flat panel displays could be significantly reduced.

Accordingly, it would be desirable to be able to easily and inexpensively reclaim a predetermined metallic material from an article comprising a non-metallic friable substrate and the predetermined metallic material.

DISCLOSURE OF THE INVENTION

One object of the present invention is to provide a method of reclaiming a predetermined metallic material from an article comprising a non-metallic friable substrate and the predetermined metallic material.

In carrying out the above object, the method of the present invention includes a method for reclaiming a metallic material from an article including a non-metallic friable substrate and the metallic material. The method comprises crushing the article into a plurality of pieces and dissolving the metallic material in an acidic solution to form an etchant effluent. The etchant effluents is then separated from the friable substrate and is treated with a precipitation agent, which precipitates out the metallic material. The metallic material is then recovered.

The objects, features and advantages of the present invention are readily apparent from the following detailed description of the best mode for carrying out the invention when taken in connection with the accompanying drawings.

BEST MODES FOR CARRYING OUT THE INVENTION

General Description

The present invention relates to a method for separating a predetermined metallic material from an article comprising a non-metallic friable substrate and the predetermined metallic material. The method may vary in dependence upon the article, and in particular, upon the materials which comprise the article. The present invention also relates to a system for performing the method of the present invention. Both the methods and the systems of the present invention will be described hereinafter in an integrated manner to facilitate an understanding of the different aspects of the present invention.

Figure 1:
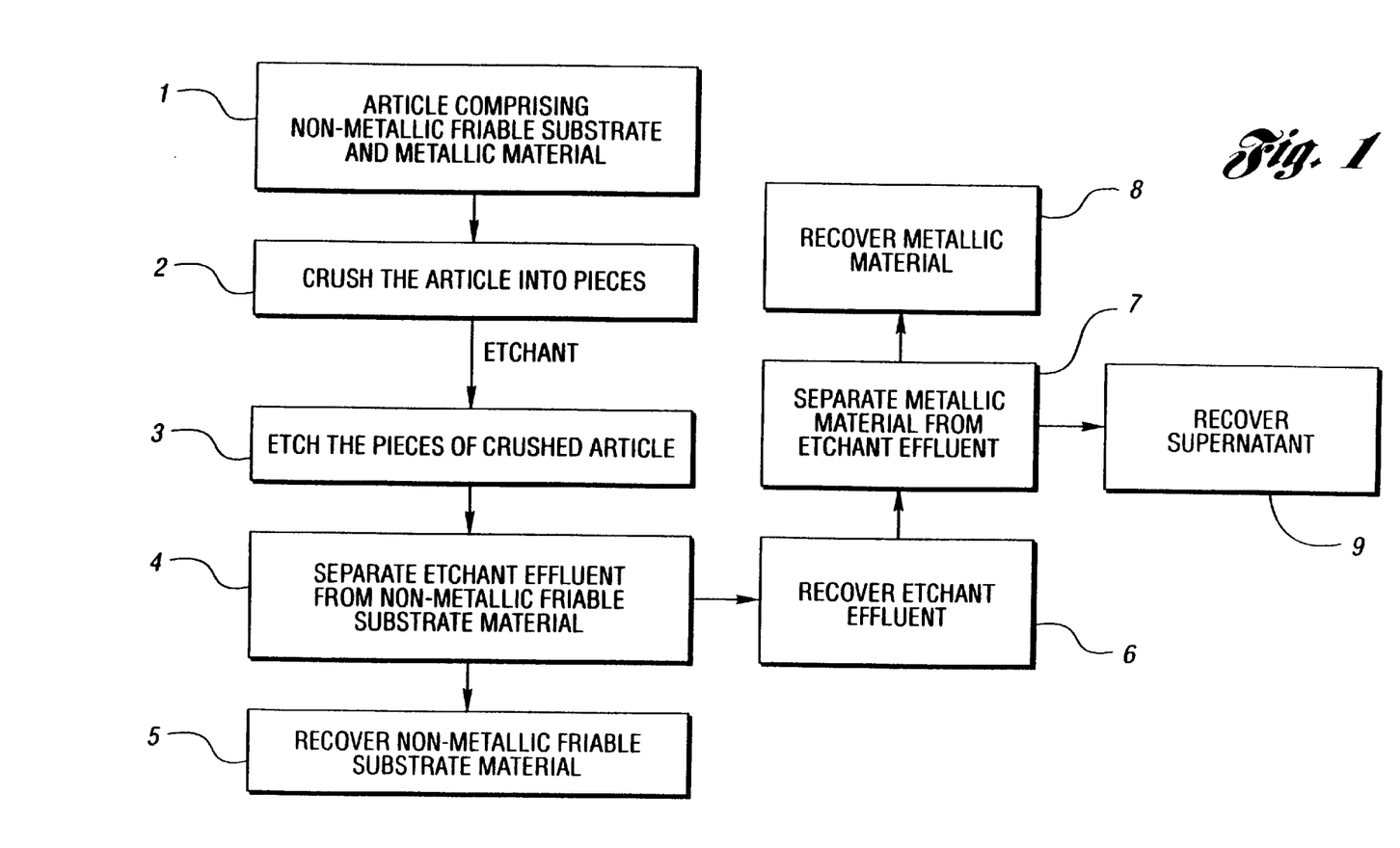
FIG. 1 is a flow diagram illustrating the method of reclaiming metallic materials from an article comprising a non-metallic friable substrate of the present invention.

With reference to FIG. 1, a method is disclosed to separate, or reclaim, a predetermined metallic material from an article minimally comprising a non-metallic friable substrate and the predetermined metallic material. It should be understood that the article could also comprise a plurality of non-metallic friable substrates and/or a plurality of predetermined metallic materials, as well as other components.

A friable material is defined as any material that will crush or powder upon impact. Examples of non-metallic friable substrates include substrates made of materials which include, but are not limited to, glass, wood and plastic. Examples of the predetermined metallic materials include, but are not limited to; hazardous metallic materials such as, barium, cadmium, lead, mercury, selenium, and silver, and valuable metallic materials such as, tellurium and gold. Example of articles comprising at least one non-metallic friable substrate and at least a predetermined metallic material include, but are not limited to, cadmium telluride photovoltaic solar cell modules, copper indium diselinide photovoltaic solar cell modules, cathode ray tubes, lead acid battery casings, substrates having lead paint therein, fluorescent lamps, glass mirrors and plasma flat panel displays.

With reference to FIG. 1, to reclaim a predetermined metallic material from article 1 comprising a non-metallic friable substrate and the predetermined metallic material, the article is crushed 2 or broken up into a plurality of pieces having a sufficiently small average piece size. The crushing step 2 can be performed in any number of ways.

One suitable non-limiting manner of performing the crushing step is to load the article into a crushing device, such as a hammer mill having a rotating arm which is capable of repeated forcible impact upon the article. The article could be manually loaded into the crushing device or loaded into an automated device which could provide a means for elevating and dropping the article into the crushing device.

After the article is crushed, the crushed article is then transferred to a vessel containing an etchant which is capable of dissolving the predetermined metallic material. The etchant then dissolves, or etches 3, the metallic material, resulting in an etchant effluent comprising the predetermined metallic material dissolved in the etchant, and a solid phase, comprising at least the friable non-metallic substrate of the article. Mixing and/or heat may be introduced in this dissolving step to aid in the dissolution of the metallic material.

The resulting solid phase is then separated 4 and from the etchant effluent in any suitable manner. The non-metallic friable substrate material of the solid phase is then recovered 5 and the etchant effluent is also separately recovered 6. At least one rinsing step using water, or another suitable rinsing agent, could be preferred to rinse any etchant effluent from the solid phase. If the solid phase comprises two or more separable materials, further separation of the materials of the solid phase could be performed. One suitable non-limiting manner of separating the solid phase from the etchant effluent is to transfer, or pour, the contents of the vessel into a separating device having a screen which has a mesh size small enough to catch the solid phase while allowing the etchant effluent to pass through into a container.

The metallic material is then separated 7 from the etchant effluent in any suitable manner. The metallic material can then be recovered 8 and the resulting supernatant, (i.e., the etchant effluent minus the metallic material) can then be recovered 9. One suitable manner of separating the metallic material is to precipitate out the metallic material. The metallic material can be precipitated out in elemental form or as a compound.

First Embodiment

Figure 2:
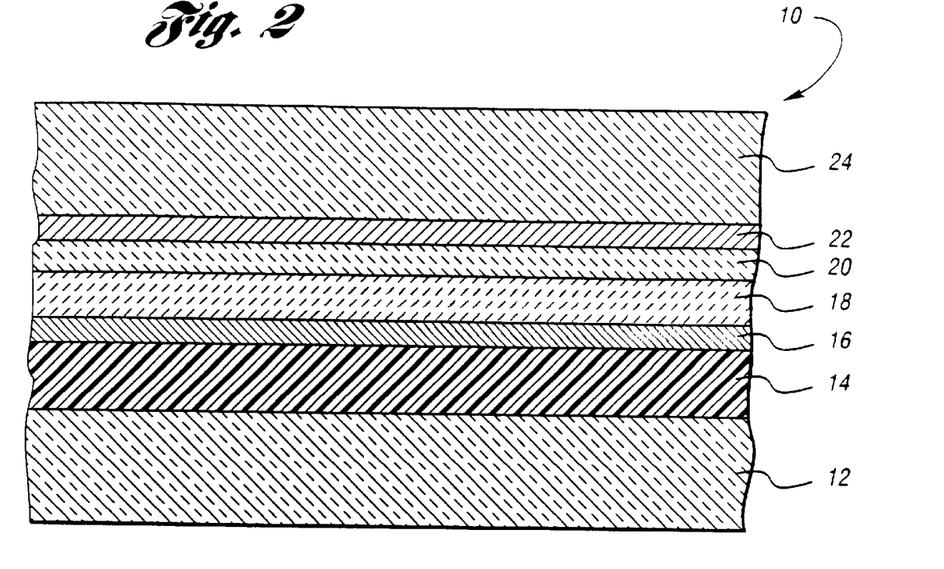
FIG. 2 is a sectional view of an article that is processed by the method in the first embodiment of the present invention.
Figure 3:
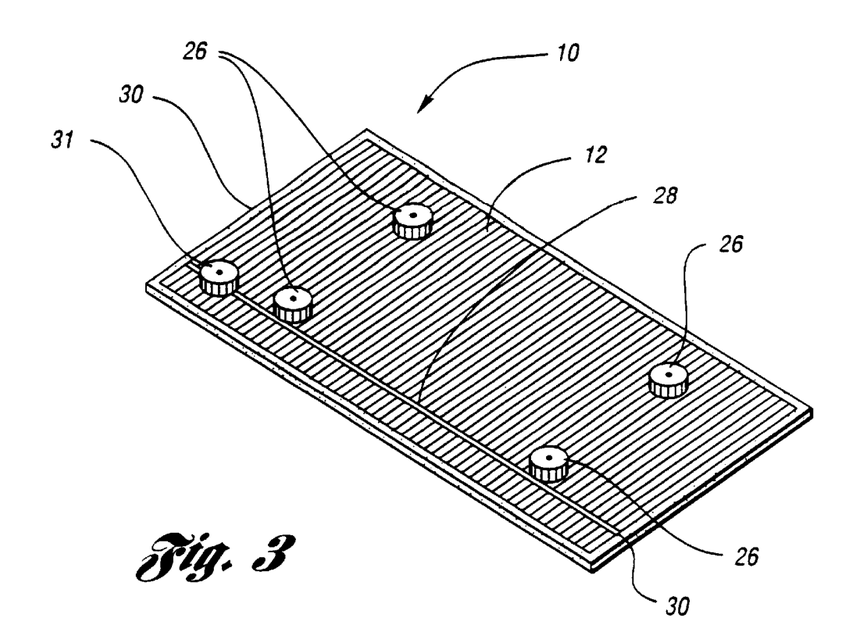
FIG. 3 is a perspective view of the article of FIG. 2.

A preferred example of a method of separating a predetermined metallic material from an article comprising a non-metallic friable substrate is the recycling of cadmium telluride photovoltaic (CdTe PV) solar cell modules 10 (FIG. 2). The module 10 may be of a variety of constructions. A exemplary module 10 is shown in FIGS. 2 and 3 and comprises a friable first glass layer 12. A layer 14 of friable ethylene-vinyl acetate (EVA) is adhered to and overlies the first glass layer 12. A metal contact layer 16 is adhered to and overlies the EVA layer 14. A layer 18 of metallic cadmium telluride (CdTe) is adhered to and overlies the metal contact layer 16. A cadmium sulfide (CdS) layer 20 is adhered to and overlies the CdTe layer 18. A metallic layer 22 of tin oxide doped with fluorine ($SnO_2$:F) is adhered to and overlies the CdS layer 20. A second friable glass layer 24 is adhered to and overlies the $SnO_2$:F layer 22. The first and second glass layers 12 and 24, thus, encapsulate the layers 14–22.

The first glass layer 12 (FIG. 3) of the module 10 has secured thereto four mounting members 26 made preferably of a polymeric material, such as polyurethane. The module 10 further includes a tin-coated copper bus bar 28 extending between and connecting tin-coated copper bus bars 30 at opposite ends of the module. An electrical potting 31 made of a polymeric material is secured to the first glass layer 12. The module 10 thus preferably contains glass, EVA, contact metal, cadmium, tellurium, sulfur, fluorine-doped tin oxide, tin, copper and polyurethane.

Figure 4:
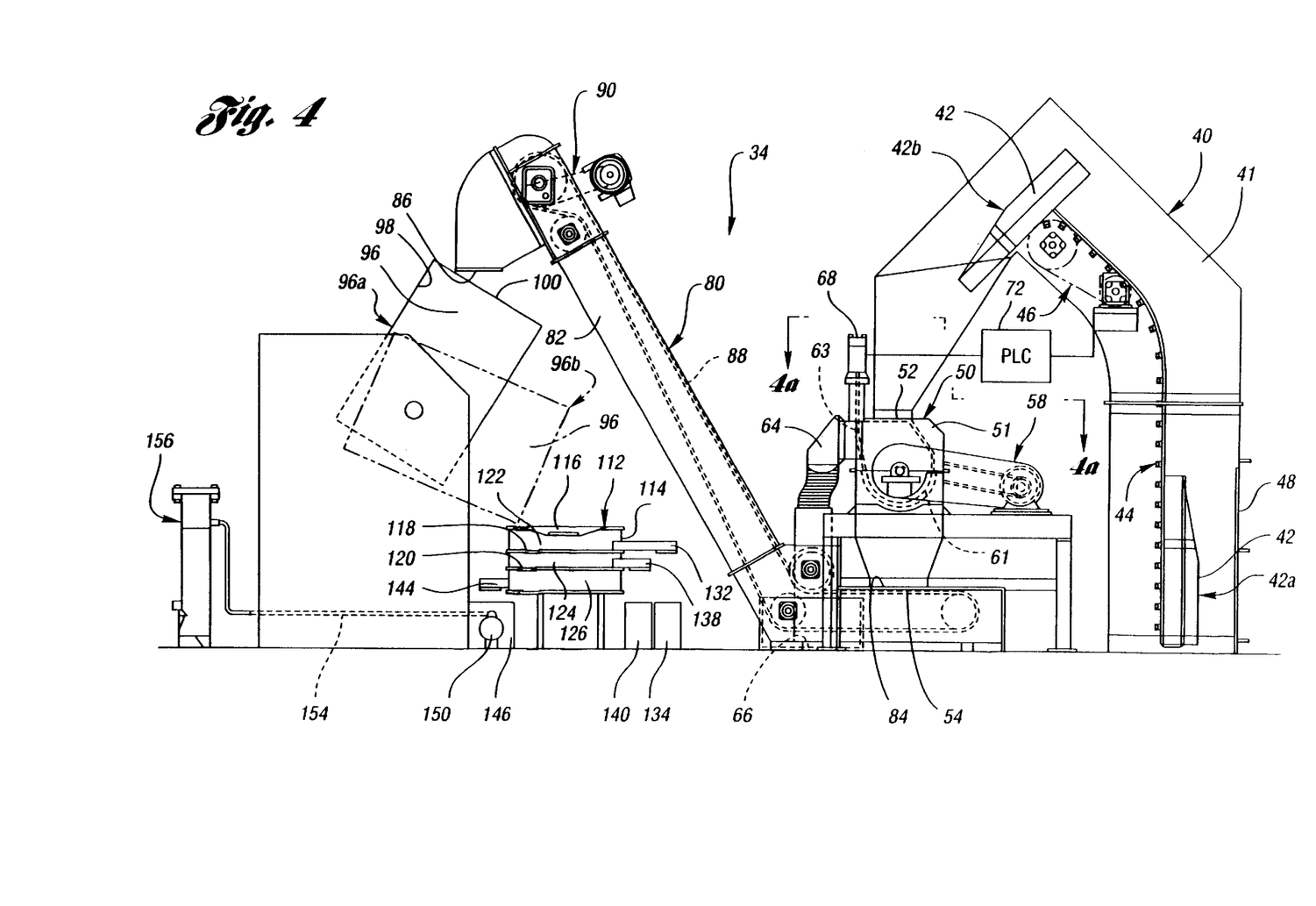
FIG. 4 is an elevational view of a part of a system for carrying out the method in the first embodiment of the present invention.

With respect to FIG. 4, a system 34 of apparatuses is constructed according to the invention to perform the method of separating cadmium and tellurium from the modules 10 of the first embodiment. Both the system 34 and the method of the present invention will be hereinafter more fully described in an integrated manner to facilitate an understanding of the different aspects of the present invention.

Figure 4A:
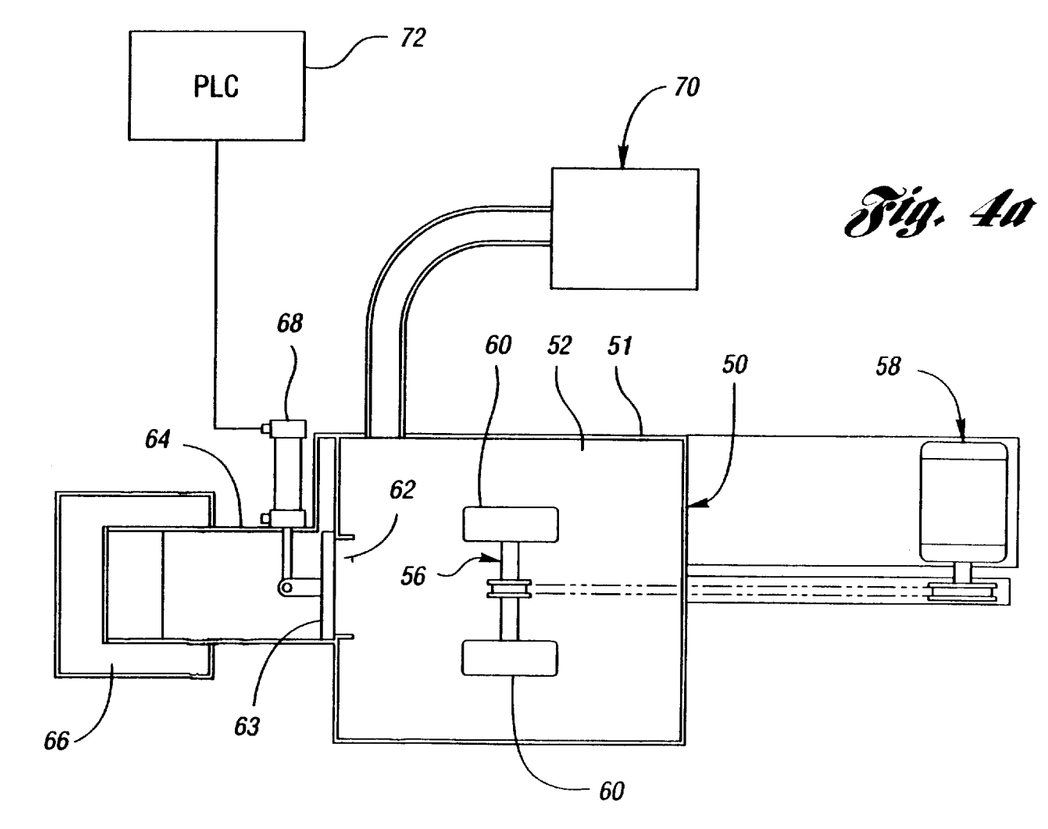
FIG. 4a is view taken along line 4a—4a of FIG. 4.

To reclaim the tellurium and cadmium from the module 10, the modules, if intact or in relatively large pieces, are first crushed to relatively small pieces by a crushing apparatus. The crushing apparatus could be of a variety of constructions. An example of a suitable crushing apparatus 50 is shown in FIG. 4. The crushing apparatus 50 (FIG. 5) includes a housing 51 having an inlet opening 52 for allowing ingress of the modules 10 into the crushing apparatus and a discharge opening 54, spaced below the input, for allowing egress of the crushed module pieces from the crushing apparatus. The crushing apparatus 50 (FIG. 4a) includes a crushing arm 56 rotatably driven by a motor 58. The crushing arm 56 includes a pair of hammer heads 60, preferably made of a tungsten-carbide alloy. A screen 61 (FIG. 4) is disposed between the crushing arm 56 and the discharge opening 54. A preferred crushing apparatus 50 is a Buffalo Hammer Mill model WA-25-L, manufactured by the Buffalo Hammer Mill Corporation of Buffalo, N.Y. It should be understood that this crushing step could be performed in any suitable manner or could be skipped if the module(s) 10 are sufficiently small to begin with.

The housing 51 further includes a debris opening 62 closeable by an openable trap door 63. The debris opening 62 is transverse to the input and the discharge openings 52 and 54 of the housing 51. A discharge duct 64 is connected to the housing 51 adjacent to the debris opening 62 and communicates the debris opening with a debris container 66. An air cylinder 68 is provided which communicates with the housing discharge duct 64. The air cylinder 68 is coupled to and selectively controllable by a suitable programmable logic controller 72 (PLC) to selectively move the trap door 63 away from the debris opening 62 to selectively open the trap door 63. A dust collector 70 (FIG. 4a) is provided which communicates with the housing 51 of the crushing apparatus 50 for collecting dust generated during the crushing step. A preferred dust collector 70 is a Torit® Downflo® dust collector, model SDF-6 from Clear Air Systems, Inc. of Columbus, Ohio.

While the modules 10 can be manually loaded into the crushing apparatus 50, they are preferably loaded into the crushing apparatus by an automated device such as a module conveyor 40 (FIG. 4) which may be of a variety of constructions.

With continuing reference to FIG. 4, an example of a suitable module conveyor 40 is shown. The module conveyor 40 includes a housing 41 containing an essentially rectangular bin 42 which is carried by a chain 44. The bin 42 is preferably made of steel and includes a polypropylene lining. The bin 42 is closed at the bottom and is opened at the top such that the bin is capable of accommodating and transporting modules 10 and/or pieces of modules. The chain 44, which is driven by motor 46, is capable of carrying the bin 42 between an upright, lower module loading position (shown at 42a) and an upturned, elevated module evacuating position (shown at 42b). The housing 41 includes a door 48 for allowing ingress of the modules into the housing and specifically into the bin 42.

The door 48 of the module conveyor 40 is opened, when the bin 42 is in the lower module loading position (shown at 42a), and at least one module 10, and preferably three modules, are placed inside the bin. It should be understood that the term "module" refers to broken-up pieces of modules as well as whole or intact modules. Any electrical connection wires connected to the modules 10 are manually removed, preferably with a wire cutting tool, prior to placement of the modules into the bin 42. Once inside the bin 42, the modules 10 are transported in the bin from the lower module loading position (shown at 42a) to the upturned, elevated module evacuating position (shown at 42b).

The bin 42, when in, or near, the upturned, elevated module evacuating position (shown at 42b), discards the modules 10 into the crushing apparatus 50 through the inlet opening 52. After releasing the modules 10 into the crushing apparatus 50, the bin 42 is returned to the lower module loading position (shown at 42a) to receive the next load of modules 10. The programmable logic controller (PLC) 72 is coupled to the, and can control, the operation of the chain motor 46, and thus the movement of the bin 42. A preferred module conveyor 40 is a Gough 2609 series Skip Hoist from Gough Econ of Charlotte, N.C.

Within the crushing apparatus 50, the modules 10 are crushed to a suitable size by their impaction with the rotating arm 56 and the hammer heads 60. The modules 10 when crushed to a suitable size are sufficiently small enough to pass through the screen 61 and the discharge opening 54 to an inclined conveyor device 80. While the crushing of the modules 10 is taking place, the dust collector 70 (FIG. 4a) removes any dust particles within the housing 41.

After a predetermined period of time, when all of the components of the modules 10, except the polyurethane mounting members 26 and the electrical potting 31 that may be on the modules, are crushed, the trap door 63 is opened and the polyurethane mounting members 26 and the electrical potting 31 are delivered through the debris opening 62 and the duct 64 to the debris bin 66. The trap door 63 is then closed after the mounting members 26 and potting 31 have exited the housing 51. The mounting members 26 and potting 31 can be disposed of as non-hazardous waste or recycled. Using the crushing apparatus 50 to automatically remove and separate any mounting members 26 and potting 31 from the modules 10 significantly reduces labor requirements necessary to prepare the modules 10 for reclaiming the cadmium and tellurium from the modules.

With continuing reference to FIG. 4, the inclined conveyor 80 includes a housing 82 having a inlet opening 84 and a discharge opening 86. The inlet opening 84 is positioned below the discharge opening 54 of the crushing apparatus 50. The inclined conveyor 80 further includes a conveyor belt 88 driven by a motor 90. The conveyor belt 88 is preferably made of a slip resistant material, such as rubber, and preferably has cleats for further preventing slippage of the pieces of the modules 10. The conveyor belt 88 transports the crushed pieces of the modules 10 exiting the crushing apparatus 50 to a pivotable and rotatable conical barrel 96. It should be noted that means other than the inclined conveyor 80, such as a horizontal conveyor, or a bucket conveyor, or some other suitable manner, could be used to transport the pieces of the modules 10 into the barrel 96.

The barrel 96 preferably has a liner 98 made of a durable material, such as the polymeric materials, urethane or neoprene, and includes an opening 100 for permitting ingress to, and egress from, the barrel. The barrel 96 is pivotal between a first essentially upright position (shown as 96a), in which the opening 100 is positioned below the discharge opening 86 of the inclined conveyor 80, and a second essentially horizontal position (shown at 96b). The barrel 96, when in its first position, is able to receive the pieces of modules 10 which are exiting the discharge opening 86 of the inclined conveyor 80. A preferred barrel 96 is the TC-9V Tilting Barrel Finisher from VL/Rampe Finishing Equipment Co. of Marshall, Mich.

Preferably prior to entry of the pieces of modules 10 to the barrel 96, the barrel is loaded with an acidic etchant. The acidic etchant could comprise any suitable acidic solution such as, sulfuric acid, nitric acid, or ferric chloride in hydrochloric acid or mixtures of acids. The etchant preferably comprises the following components detailed in Table 1:

TABLE 1

| Material | Molar Concentration (Moles/liter) | Weight Percent |
| --- | --- | --- |
| Sulfuric Acid | 2.72 | 12.6 |
| Hydrogen Peroxide | 0.11 | 0.4 |
| Sodium 2-Ethyhexyl Sulfate* | 0.02 | 0.4 |
| De-ionized Water | Balance | 86.6 |

*Trade Name = Niaproof ® Anionic Surfactant 08, manufactured by Niacet Corporation of Niagara Falls, NY.

Preferably, the barrel 96 contains 4 liters of the etchant described in Table 1 for each module 10 to be processed. It is contemplated that the molar concentration of the sulfuric acid could range from about 1.2 to about 5.5 Moles/liter.

Once inside the barrel 96, the CdTe and CdS layers 18 and 20, respectively, along with the metal contact layer 16, are separated from the pieces of modules 10 (i.e., glass substrate and EVA laminate flakes) by dissolving, or etching, them in the etchant. It is believed that the principal reactions occurring in the barrel 96, when the etchant is as described in Table 1, are:

$$CdTe_{(s)} + 3H_2SO_4 + 3H_2O_2 = CdSO_{4(aq)} + Te(SO_4)_{2(aq)} + 6H_2O \quad (I)$$

and:

$$CdS_{(s)} + H_2SO_4 + H_2O_2 = CdSO_{4(aq)} + 2H_2O + S_{(s)} \quad (II)$$

To facilitate the etching step, the barrel 96 can be rotated thereby supplying mechanical energy to the reactions. Additional mixing and/or heat can also be provided in the etching step. The durable liner 98 of the barrel 96 provides resistance to the corrosive nature of the strong acid etchant and the mechanical abrasion of the crushed glass and EVA particles. The mechanical energy applied by the vigorous agitation of the rotating barrel finishing machine enhances the semiconductor etching process by creating attrition between the crushed glass particles. This attrition, along with the strength of the acidic etchant, allows the semiconductor etching to be done at ambient temperatures in preferably less than about 20 minutes.

After etching, the barrel 96 is pivoted to its second position (96b) to allow the contents of the barrel 96 to be poured into a removable two deck vibratory screen separator 112. It is believed that after the etching step, the contents of the barrel 96 are (i) pieces of crushed glass, (ii) crushed EVA flakes, and (iii) a liquid etchant effluent containing, among other things, dissolved cadmium and tellurium. It should be noted that the etchant effluent could be first decanted through the separator 112 before the crushed glass and EVA Flakes are admitted to the separator. Also, an optional rinsing step could be performed to help reduce, or eliminate, the quantity of etchant effluent on the crushed glass and EVA and/or barrel 96.

The screen separator 112 includes a housing 114 having an opening 116, which is preferably defined by a conical lid, for allowing ingress of the contents of the barrel 96. The housing 114 of the screen separator 112 accommodates a first screen 118 and a second screen 120, spaced apart from, and below, the first screen 118. The first and second screens 118 and 120 are both preferably wire cloth screens. The second screen 120 has a mesh number which is less than the mesh number of the first screen 118 such that the openings in the second screen are smaller than the openings in the first screen.

The screens 118 and 120 help to define a first chamber 122, a second chamber 124 and a third chamber 126. A first duct 132 extends from the first chamber 122 and provides a path from the first chamber to a first solids bin 134. A second duct 138 extends from the second chamber 124 and provides a path from the second chamber to a second solids bin 140. A third duct 144 extends from the third chamber 126 and provides a path from the third chamber to an etchant effluent recovery tank 146. The screen separator 112 separates the contents of the barrel 96 into three different components. The screen separator 112 could include a nozzle spray system for further rinsing the crushed glass and EVA and/or for aiding in the separation of the barrel contents. A preferred screen separator 112 is a Kason model K30-2-SS Vibroscreen separator from Kason Corp. of Millburn, N.J.

The first screen 118, preferably having a 3 mesh size, is sized to catch or retain the EVA flakes while allowing the etchant effluent and glass particles, which are more friable than the EVA, and thus break into smaller pieces than the EVA, to pass through to the second chamber 124. The EVA flakes are then expunged from the first chamber 122 through the first duct 132 into the first solids bin 134 by the vibratory action of the screen separator 112. It should be noted that a very small amount of the copper, from the bus bars 30, is believed to also be expunged to the first solids bin 134 along with the EVA particles.

The second screen 120, preferably having a 60 mesh size, is sized to catch or retain the glass particles while allowing the etchant effluent to pass through to the third chamber 126. The glass particles are then expunged from the second chamber 124, along with the still adherent $SnO_2$:F from the $SnO_2$:F layer 22, through the second duct 138 into the second solids bin 140 by the vibratory action of the screen separator 112.

The etchant effluent is allowed to pass through the third duct 144 into the etchant effluent recovery tank 146. It is believed that the etchant effluent, when the etchant is as described in Table 1, comprises aqueous cadmium sulfate and tellurium sulfate and the solid sulfur (very fine particles) from reactions (I) and (II), the contact metal, and the tin from the bus bars 30.

The EVA and glass particles, believed to be free of any metallic particles and having only negligible amounts of copper and $SnO_2$:F, respectively, are then appropriately disposed of. The glass can then be resold as glass cullet. Any glass fines in the etchant effluent recovery tank 146 are preferably removed, by any suitable means, such as a screen filter rake, as they settle out and are deposited in the second solids bin 140.

The etchant effluent in the etchant effluent recovery tank 146 is preferably conveyed, via pump 150, through a conduit 154 to a bag filter 156. From the bag filter 156 (FIG. 5), the filtered etchant effluent is conveyed, via pump 157, through a conduit 158 to a reaction tank 160 for recovery of the cadmium and tellurium. The bag filter 156, which contains a suitable screen filter, is provided for preventing unsettled solids, such as glass and EVA from the etchant effluent recovery tank 146 from being admitted to the reaction tank 160. A preferred bag filter 156 is an Excel® Eagle series bag filter from the EDEN Corporation and distributed by the V.L. Towner Co. of Twinsburg, Ohio.

Figure 5:
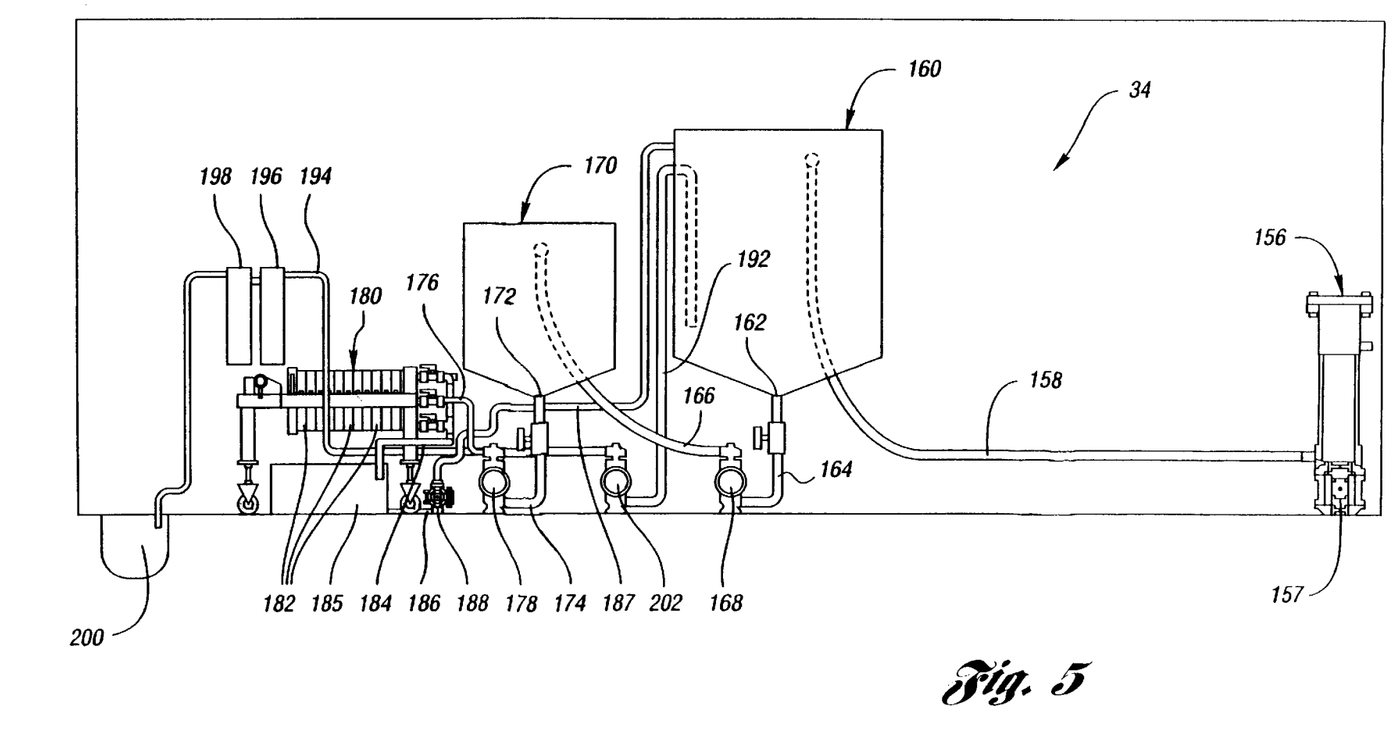
FIG. 5 is an elevational view of another part of a system for carrying out the method in the first embodiment of the present invention.

A suitable alkaline or reductive precipitation agent is added to the etchant effluent in the recovery tank 160 to co-precipitate the cadmium and tellurium from the etchant effluent. Suitable alkaline or reductive precipitation agents, include, but are not limited to, carbonates, such as, sodium carbonate ($Na_2CO_3$) and calcium carbonate ($CaCO_3$); hydroxides, such as, sodium hydroxide (NaOH), potassium hydroxide (KOH) and ammonium hydroxide ($NH_4OH$); sulfides, such as, hydrogen sulfide ($H_2S$); borohydrides, such as sodium borohydride ($NaBH_4$); and lime. The preferred precipitation agent is sodium carbonate, which can be added to the reaction tank 160 in either solid or pre-slurried form. Sodium carbonate, as a precipitation agent, has the advantages of being a cheap, readily available, low hazard material. The sodium carbonate raises the pH of the etchant effluent from about 0 to effectively precipitate Cd at relatively low pH (8 to 9), to guard against the accidental discharges of high pH effluent. An antifoaming agent, such as Nalco 71DS Plus Antifoam, from the Nalco (Chemical Company, of Naperville, Ill., may be added along with the sodium carbonate to help control any foam ($CO_2$ gas) that may be generated during the etchant precipitation step.

The precipitation of the cadmium and tellurium from the etchant effluent results in (i) a sludge, containing about 4% solids, comprising cadmium and tellurium compounds, which settles to the bottom of the reaction tank, and (ii) an aqueous supernatant. It is believed that precipitation of the cadmium and tellurium in the reaction tank 160 occur according to the following principle reactions, when the precipitation agent is sodium carbonate:

(III)

(IV)

Thus, when sodium carbonate is used as the precipitation agent, it is believed that the sludge comprises aqueous sodium sulfate (i.e., supernatant), cadmium carbonate, and tellurium oxide from reactions (III) and (IV) and that the supernatant comprises sodium sulfate. It is believed that the sludge also comprises the contact metal and the sulfur from reaction (II).

After the sludge settles, the supernatant, which may contain a relatively small quantity of cadmium such as less than 6 ppm, is conveyed, via pump 202, from the reaction tank 160, through conduits 192 and 194, through a cartridge filter 196, through an ion exchange column 198 and into a sewer drain 200. The cartridge filter 196 contains at least one water filtration cartridge, suitable for use in trapping fine unwanted particles suspended in the supernatant such as string wound dirt cartridge. The ion exchange column 198 contains either a cationic exchange resin, an anionic exchange resin, or a mixture of both. The ion exchange column 198 removes any soluble cadmium remaining in the supernatant. Thus, when the precipitation agent is sodium carbonate, the treated supernatant discarded down the drain 200 is harmless sodium sulfate.

The sludge is then conveyed, via pump 168, from an outlet 162 of the reaction tank 160, through conduits 164 and 166 to a sludge tank 170. A filtering aid, such as diatomaceous earth, pearlite, or preferably, lime, is then added to the sludge tank 170. The resulting sludge is then conveyed from an outlet 172 of the sludge tank 170, through conduits 174 and 176, via pump 178 to a filter press 180. It should be noted that the sludge tank 170 could be eliminated in which case the sludge would be pumped directly from the reaction tank 160 to the filter press 180 either with or without a filtering aid being added.

The filter press 180 contains a plurality of screen filter cloths 182 which filter essentially all of the solids from the sludge resulting in an sludge effluent of aqueous supernatant and a high solids filtered sludge containing about 40–60% solids accumulated on the screen filter cloths 182. A preferred filter press 180 is the JWI® Filter Press, model #320G32-8.5MYLW from JWI of Holland, Mich. The sludge effluent is conveyed from the filter press 180 through conduit 184 to a sludge effluent holding tank 185. The sludge effluent is then conveyed from the sludge effluent holding tank 185, through conduits 186 and 187, via pump 188 into the reaction tank 160, for a subsequent use in the reaction tank and to enable a later recovery of any solids in the sludge effluent that were not captured by the screen filter cloths 182.

The filtered sludge is then recovered (i.e., scrapped off) from the screen filter cloths 182 and transferred to a tellurium extraction tank 220 (FIG. 6) containing an alkaline solution suitable for leaching the tellurium. The alkaline solution is preferably potassium hydroxide (KOH) but could also be sodium hydroxide or another alkaline solution.

Figure 6:
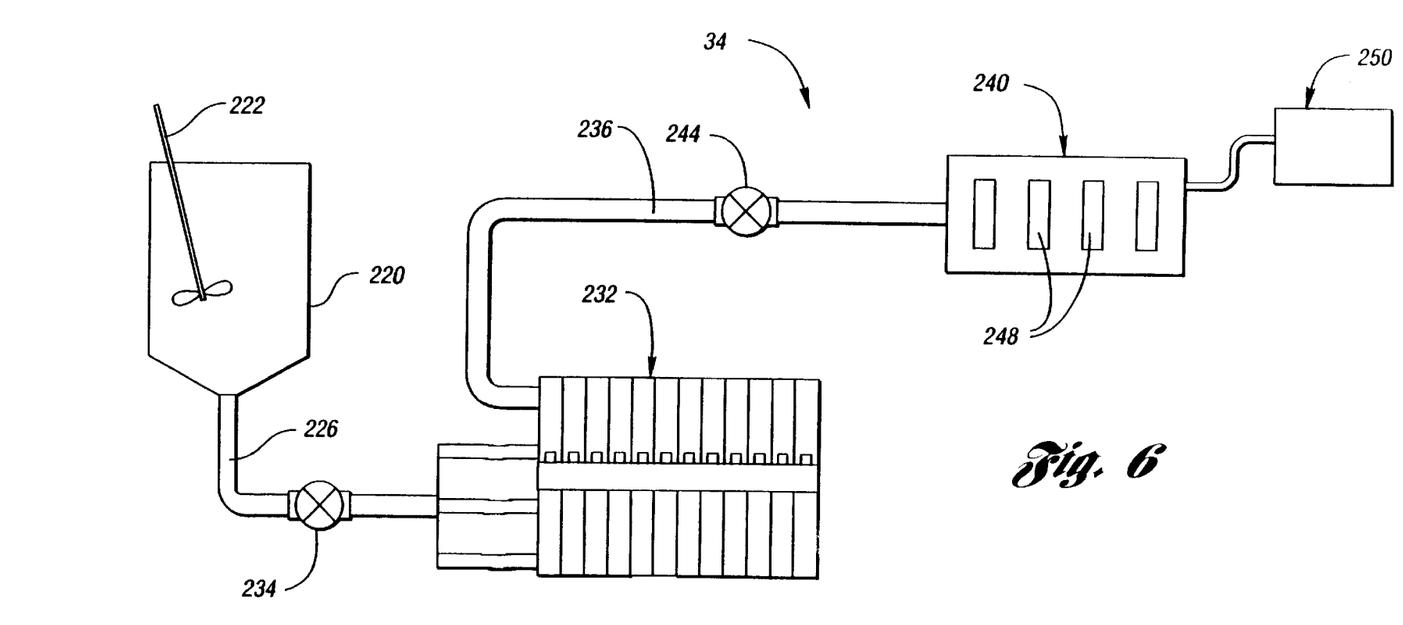
FIG. 6 is an elevational view of yet another part of a system for carrying out the method in the first embodiment of the present invention.

The extraction tank 220 includes a mixing device 222 for dispersing the filtered sludge throughout the potassium hydroxide. It is believed that the tellurium oxide ($TeO_2$), which is present in the filtered sludge when sodium carbonate is the precipitation agent, reacts with the potassium hydroxide to form potassium tellurite ($K_2TeO_3$) according to the following reaction:

$$TeO_{2(s)} + 2KOH = K_2TeO_{3(aq)} + H_2O \qquad (V)$$

The filtered sludge, when dispersed in the potassium hydroxide, results in a leachant effluent in the extraction tank 220 which is believed to comprise the potassium tellurite of equation (V) and cadmium carbonate ($CdCO_3$). The contact metal, the sulfur from reaction (II), and the filtering aid (lime) are also believed to be present in the filtered sludge.

The leachant effluent is then conveyed via pump 234, from the extraction tank 220 through conduit 226 to a filter press 232, of similar construction to filter press 180.

The filter press 232 filters essentially all of the solids from the leachant effluent resulting in a leachant sludge and a extractant effluent. The leachant sludge comprises essentially the leachant effluent without the potassium tellurite (i.e., cadmium compound, contact metal, sulfur and lime).

The extractant effluent, according to equation (V), comprises essentially potassium tellurite.

The extractant effluent is conveyed through conduit 236 to an electrolytic cell 240 via pump 244. The electrolytic cell 240 comprises a plurality of electrolytic plates 248 and is coupled with a rectifier 250 which provides electric current to the electrolytic cell 240. The tellurium is then electrowon from the extractant effluent according to the following reaction.

$$K_2TeO_{3(aq)} + 4e^- + H_2O = Te^0_{(s)} + 2KOH + O_2. \qquad (VI)$$

This results in elemental tellurium, which can be recovered from the electrolytic plates 248 and resold, and potassium hydroxide which can be reused at a later time in the extraction tank 220.

The leachant sludge, containing at least the cadmium compound, can be then be recovered from the filter press 232 and appropriately disposed of or further purified.

Preliminary leaching tests have resulted in 67% tellurium recovery from the $Na_2CO_3$ precipitate sludge. Subsequent electrowinning of the resulting potassium tellurite solution has shown no contamination with Cd or other metals after energy dispersive spectroscopy analysis.

The equipment used in the system 34 is easily scaleable for any practical throughput requirement or module size. Floor space required for the system 34 is preferably about 800 ft² but could be lower or higher depending on throughput requirements.

Second Embodiment

Figure 7:
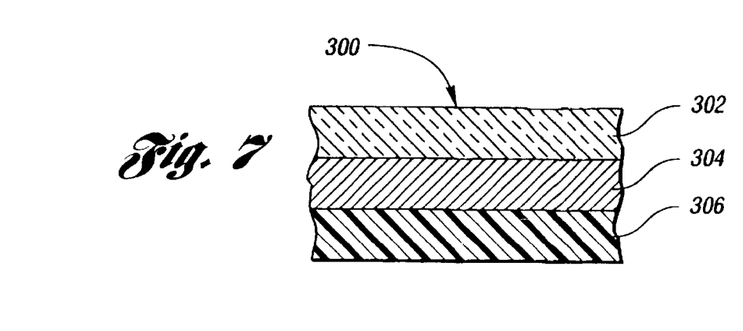
FIG. 7 is a sectional view of an article that is processed by the method in the second embodiment of the present invention.

Another example of a method of reclaiming a predetermined metallic material from an article comprising a nonmetallic friable substrate is the recycling of glass mirrors 300. An exemplary glass mirror 300 is shown in FIG. 7 and comprises a glass layer 302, a metallic silver coating layer 304, deposited on a side of the glass layer, and a paint layer 306 overlying the silver coating layer. The paint making up the paint layer 306 typically contains a quantity of metallic lead.

To recover the silver and lead, separately, from the glass mirror 300, the glass mirror is first crushed in any suitable manner, and preferably in the manner described above with respect to the modules 10.

The pieces of crushed glass mirror 300 are then transferred to an etching vessel, which can be any suitable vessel and is preferably similar to the pivotable barrel 96 described above with respect to the modules 10.

An acidic etchant, suitable for dissolving the silver and lead, is provided in the etching vessel either before or after the pieces of the crushed glass mirror 300 are transferred to the etching vessel. The acidic etchant can comprise any suitable acidic solution. The acidic etchant preferably comprises a mixture of concentrated sulfuric acid (98%), concentrated hydrogen peroxide (30%), nitric acid (30%) and water. Most preferably, the acidic etchant comprises, on a volume percent basis, 26% concentrated hydrogen peroxide, 26% concentrated sulfuric acid, 4% nitric acid (30%) and water.

To facilitate the etching step, the etching vessel can be rotated and/or provided with a mixing device and/or provided with heat.

Preferably, the etching step is allowed to run for at least about two hours or until all of the silver and lead are dissolved into the etchant to form an etchant effluent.

After the etching step, the pieces of glass mirror 300, which have preferably been freed of any paint and silver, are separated from the etchant effluent by any suitable means, such as by using a screen separator. A water rinsing step can be performed to remove any residual etchant effluent on the pieces of glass and/or the etching vessel.

The etchant effluent is then treated with a suitable precipitation agent to precipitate out the silver and lead in the etchant effluent to form a sludge comprising silver and lead compounds and an aqueous supernatant. The suitable precipitation agent includes, but are not limited to, sulfides such as sodium hydrosulfide and hydrogen sulfide; and borohydrides, such as sodium borohydride.

When using a sulfide precipitation agent, it is believed that the sludge comprises silver sulfide and lead sulfide.

The sludge is then filtered in any suitable manner, and preferably with a filter press similar to the filter press 180 described above with respect to modules 10, to form an aqueous supernatant, similar to the aqueous supernatant formed in the precipitation step, and a filtered sludge, having a higher percent solids than the unfiltered sludge.

The filtered sludge can then be treated, in any suitable manner, and preferably, pyrometallurigically, to reclaim the silver and lead from the sludge. A preferred method of pyrometallurgical treatment of the sludge is to heat the sludge in a distillation column where, the lead is preferably recovered from the sludge first, with the silver then being subsequently recovered from the sludge. The resulting sludge could then be further treated or discarded. Also, the supernatant recovered from the precipitation and filtering steps could be further treated or discarded.

It should be understood that with respect to recycling mirrors 300, a filtering aid such as the ones that were suitable for use with respect to the modules 10 could be added before the filtering step takes place.

Third Embodiment

Figure 8:
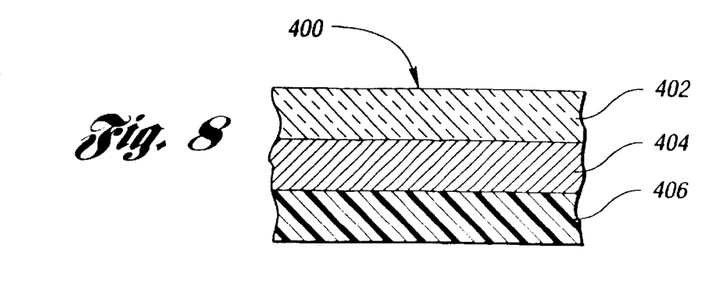
FIG. 8 is a sectional view of an article that is processed by the method in the third embodiment of the present invention.

Yet another example of a method of reclaiming a predetermined metallic material from an article comprising a non-metallic friable is the recycling of plasma flat panel display 400. An exemplary plasma flat panel display 400 is shown in FIG. 8 and comprises a glass layer 402, a metallic gold layer 404 comprising a plurality of gold lines deposited on a side of the glass layer, and a lead oxide ($PbO_2$) dielectric layer 404 overlying the gold coating layer.

To recover the gold and lead, separately, from the plasma flat panel display 400, the panel display 400 is first crushed in any suitable manner, and preferably in the manner described above with respect to the modules 10.

The pieces of crushed plasma flat panel displays 400 are then transferred to an etching vessel, which can be any suitable vessel and is preferably similar to the pivotable barrel 96 described above with respect to the modules 10.

A first acidic etchant, suitable for dissolving the lead, is provided in the etching vessel either before or after the pieces of crushed glass are transferred to the etching vessel. The first acidic etchant can comprise any suitable acidic solution, and preferably comprises concentrated nitric acid.

To facilitate the first etching step, the etching vessel can be rotated and/or provided with a mixing device and/or provided with heat.

Preferably, the first etching step is allowed to run for a period of time sufficient to enable all of the lead to be dissolved into the etchant to form a first etchant effluent.

The first etchant effluent is then separated from the pieces of crushed panel displays 400, by any suitable means, and preferably by a screen separator. An optional water rinsing step can then be performed to remove any residual first etchant effluent which may remain on the pieces of crushed panel displays 400 and/or in the etching vessel. If necessary, the crushed panel displays 400 are then placed back in the etching vessel.

A pH adjuster is then added to the first etchant effluent to raise the pH of the first etchant effluent from about −1 to about 5–8. Suitable pH adjusters include, but are not limited to, hydroxides such as sodium hydroxide; potassium hydroxide; and ammonium hydroxide; and carbonates. Sodium hydroxide is the preferred pH adjuster. After the pH of the first etchant effluent has been raised to between 5 and 8, a suitable precipitation agent is added to the first etchant effluent to precipitate out the lead in elemental form. Suitable precipitation agents include, but are not limited to sulfides such as sodium hydrosulfide and hydrogen sulfide and borohydrides, such as sodium borohydride. The preferred precipitation agent is sodium borohydride. The precipitated elemental lead is then filtered from the treated first etchant effluent. The treated first etchant effluent can then be further treated or discarded.

A second acidic etchant, suitable for dissolving the gold, is then added to the etching vessel still containing the pieces of crushed panel displays 400. The second acidic etchant can comprise any suitable acidic solution, and preferably comprises aqua regia (i.e., a solution of 25% by volume concentrated nitric acid and a 75% by volume concentrated hydrochloric acid). To facilitate the second etching step, the etching vessel can be rotated and/or provided with a mixing device and/or provided with heat. Preferably, the second etching step is allowed to run for a period of time sufficient to dissolve all of the gold to form a second etchant effluent.

After the second etching step, the pieces of panel displays 400, which have preferably been freed of any gold and lead, is separated from the second etchant effluent by any suitable means, such as by using a screen separator. An optional water rinsing step can be performed to remove any residual second etchant effluent remaining on the pieces of crushed panel displays 400 and/or in the etching vessel. The glass can then be resold as glass cullet.

A suitable pH adjuster is then added to the second etchant effluent to raise the pH of the second etchant effluent from about −1 to between about 5 and 8. Suitable pH adjusters include the pH adjusters described above with respect to the first etchant effluent. The gold in the second etchant effluent can then be precipitated but by using a precipitation agent. Suitable precipitation agents include the precipitation agents discussed above with respect to the first etchant effluent.

While the best modes for carrying out the invention have been described in detail, those familiar with the art to which the invention relates will appreciate other ways of carrying out the invention defined by the following claims. For instance, that the different steps described above can be performed with equipment and/or reactants which differ from those identified above.

The term "cadmium", as used above and in the claims, can mean elemental cadmium as well as cadmium compounds. The term "tellurium", as used above and in the claims, can mean elemental tellurium as well as tellurium compounds.

What is claimed is:

1. A system for reclaiming cadmium and tellurium from a cadmium telluride solar cell comprising glass, polymeric material, cadmium and tellurium, said system comprising:
   a crushing apparatus for crushing at least one cell into pieces of the cells;
   a first conveyor for transporting at least one cell to said crushing apparatus;
   a barrel for receiving etchant for etching the crushed pieces of the cell to form an etchant effluent comprising cadmium and tellurium dissolved in the etchant;
   a second conveyor for transporting the crushed pieces of the cell from said crushing apparatus to said barrel; and
   a screen separator for separating the crushed pieces of the cell into at least three components, the three components comprising a first component comprising essentially all of the glass, a second components comprising essentially all of the polymeric material and a third components comprising essentially all of the cadmium and the tellurium.

2. The system for reclaiming cadmium and tellurium as in claim 1 further comprising a filter press comprising at least one filter for helping to separating the cadmium from the tellurium.

3. The system as in claim 2 further comprising a first tank for precipitating the cadmium and the tellurium from the etchant effluent.

4. The system as in claim 1 wherein the crushing apparatus includes a housing containing a rotatable crushing arm.

5. The system as in claim 4 wherein the crushing arm includes at least one tungsten-carbide alloy hammer head.

6. The system as in claim 4 wherein the housing comprises an inlet opening, a discharge opening, and a screen disposed between the discharge opening and the crushing arm.

7. The system as in claim 6 wherein the second conveyer has a portion that extends below the discharge opening of the crushing apparatus.

8. The system as in claim 1 wherein the second conveyor includes a belt made of slip resistant material.

9. The system as in claim 1 wherein the barrel includes a durable liner.

10. The system as in claim 1 wherein the barrel is pivotal between a first, essentially upright position, and a second, essentially horizontal position, the second position facilitating transfer of the crushed pieces of the cell from the barrel to the screen separator.

11. The system as in claim 1 wherein the barrel is rotatable about an axis.

12. The system as in claim 1 wherein the screen separator comprises three chambers.

13. The system as in claim 12 wherein the screen separator comprises a first screen spaced from a second screen to define the three chambers.

14. The system as in claim 13 wherein the second screen has a mesh number less than the mesh number of the first screen.

15. The system as in claim 14 wherein the screen separator vibrates during operation.

16. The system as in claim 13 wherein each chamber has a duct extending therefrom.

17. The system as in claim 1 further comprising an electrolytic cell for separating the cadmium from the tellurium.

18. A system for reclaiming cadmium and tellurium from a cadmium tellurium solar cell comprising glass, polymeric material, cadmium and tellurium, said system comprising:

a crushing apparatus for crushing at least one cadmium tellurium solar cell into pieces of the cell;

a vessel adapted to contain an acidic solution to dissolve the cadmium and tellurium to form an acidic effluent and a solid phase, the acidic effluent comprising the cadmium and the tellurium dissolved in the acidic solution, the solid phase comprising pieces of the glass and the polymeric substance;

a first conveyor for transporting the crushed pieces of the cell from said crushing apparatus to said vessel;

a screen separator for separating the solid phase from the acidic effluent;

a first tank for receiving the acidic effluent and a precipitation agent to form a precipitation sludge containing the cadmium and the tellurium, and a supernatant;

a filter for separating the precipitation sludge from the supernatant;

a second tank for disbursing the precipitation sludge in an alkaline solution to form an electrolytic solution comprising the tellurium, and an electrolytic sludge comprising the cadmium;

a filter for separating the electrolytic sludge from the electrolytic solution; and an electrowinning tank for electrowinning the tellurium from the electrolytic solution.

* * * * *